(12) United States Patent
Farrar et al.

(10) Patent No.: US 12,296,314 B2
(45) Date of Patent: May 13, 2025

(54) CONTINUOUS ACOUSTIC CHEMICAL MICROREACTOR

(71) Applicant: Resodyn Corporation, Butte, MT (US)

(72) Inventors: Lawrence C. Farrar, Butte, MT (US); Grayson Sperry, Three Forks, MT (US); Zachary Ruprecht Martineau, Butte, MT (US)

(73) Assignee: Resodyn Corporation, Butte, MT (US)

( * ) Notice: Subject to any disclaimer, the term of this patent is extended or adjusted under 35 U.S.C. 154(b) by 0 days.

(21) Appl. No.: 18/103,161

(22) Filed: Jan. 30, 2023

(65) Prior Publication Data
US 2023/0173451 A1   Jun. 8, 2023

Related U.S. Application Data

(60) Continuation of application No. 17/195,394, filed on Mar. 8, 2021, now Pat. No. 11,565,234, which is a
(Continued)

(51) Int. Cl.
*B01J 19/24* (2006.01)
*B01F 25/433* (2022.01)
(Continued)

(52) U.S. Cl.
CPC ......... *B01J 19/243* (2013.01); *B01F 25/4331* (2022.01); *B01F 31/57* (2022.01);
(Continued)

(58) Field of Classification Search
CPC ............. B01F 11/0266; B01F 11/0077; B01F 3/1242; B01F 21/265; B01F 31/60;
(Continued)

(56) References Cited

U.S. PATENT DOCUMENTS

| 3,045,984 A | 7/1962 | Cochran |
| 3,089,824 A | 5/1963 | Wurster |

(Continued)

FOREIGN PATENT DOCUMENTS

| CN | 103585943 A | 2/2014 |
| DE | 948820 C | 9/1956 |

(Continued)

OTHER PUBLICATIONS

Translation of Iwamoto, Takeshi (JP 2010005582, published Jan. 14, 2010. Translation retrieved Dec. 2019 (Year: 2010).*

(Continued)

*Primary Examiner* — Elizabeth Insler
(74) *Attorney, Agent, or Firm* — McDermott Will & Emery LLP

(57) ABSTRACT

A continuous acoustic chemical microreactor system is disclosed. The system includes a continuous process vessel (CPV) and an acoustic agitator coupled to the CPV and configured to agitate the CPV along an oscillation axis. The CPV includes a reactant inlet configured to receive one or more reactants into the CPV, an elongated tube coupled at a first end to the reactant inlet and configured to receive the reactants from the reactant inlet, and a product outlet coupled to a second end of the elongated tube and configured to discharge a product of a chemical reaction among the reactants from the CPV. The acoustic agitator is configured to agitate the CPV along the oscillation axis such that the inner surface of the elongated tube accelerates the one or more reactants in alternating upward and downward directions along the oscillation axis.

19 Claims, 10 Drawing Sheets

Related U.S. Application Data division of application No. 15/686,784, filed on Aug. 25, 2017, now Pat. No. 10,967,355, which is a continuation-in-part of application No. 13/965,964, filed on Aug. 13, 2013, now Pat. No. 9,808,778, and a continuation-in-part of application No. PCT/US2013/043755, filed on May 31, 2013.

(60) Provisional application No. 61/742,923, filed on Aug. 20, 2012, provisional application No. 61/689,256, filed on May 31, 2012.

(51) Int. Cl.
| | |
|---|---|
| *B01F 31/00* | (2022.01) |
| *B01F 33/30* | (2022.01) |
| *B01J 4/00* | (2006.01) |
| *B01J 8/34* | (2006.01) |
| *B01J 8/40* | (2006.01) |
| *B01J 19/00* | (2006.01) |
| *B01J 19/10* | (2006.01) |

(52) U.S. Cl.
CPC .............. *B01F 33/30* (2022.01); *B01J 4/002* (2013.01); *B01J 8/34* (2013.01); *B01J 8/40* (2013.01); *B01J 19/006* (2013.01); *B01J 19/0093* (2013.01); *B01J 19/10* (2013.01); *B01J 2208/0015* (2013.01); *B01J 2208/0061* (2013.01); *B01J 2208/0084* (2013.01); *B01J 2208/00867* (2013.01); *B01J 2208/00902* (2013.01); *B01J 2208/00938* (2013.01); *B01J 2219/00033* (2013.01); *B01J 2219/00085* (2013.01); *B01J 2219/0077* (2013.01); *B01J 2219/00772* (2013.01); *B01J 2219/00777* (2013.01); *B01J 2219/00788* (2013.01); *B01J 2219/00795* (2013.01); *B01J 2219/00822* (2013.01); *B01J 2219/00824* (2013.01); *B01J 2219/00831* (2013.01); *B01J 2219/00833* (2013.01); *B01J 2219/00835* (2013.01); *B01J 2219/00862* (2013.01); *B01J 2219/00889* (2013.01); *B01J 2219/00932* (2013.01); *B01J 2219/24* (2013.01)

(58) Field of Classification Search
CPC .. B06B 3/00; B06B 1/161; B01J 19/10; B01J 2219/24; B01J 2219/0077; B01J 19/006
See application file for complete search history.

(56) References Cited

U.S. PATENT DOCUMENTS

| | | | |
|---|---|---|---|
| 3,200,567 A | 8/1965 | May | |
| 3,237,596 A | 3/1966 | Grass et al. | |
| 3,826,740 A | 7/1974 | Jewett | |
| 4,070,503 A | 1/1978 | Philippe et al. | |
| 4,493,556 A | 1/1985 | Prew | |
| 4,848,673 A | 7/1989 | Masuda et al. | |
| 5,395,592 A * | 3/1995 | Bolleman | B01J 19/10 366/127 |
| 5,459,318 A | 10/1995 | Cacho et al. | |
| 5,460,209 A | 10/1995 | Jandura et al. | |
| 5,473,700 A | 12/1995 | Fenner, Jr. | |
| 5,836,683 A * | 11/1998 | Moon | B01F 31/81 366/175.2 |
| 6,244,738 B1 * | 6/2001 | Yasuda | B01L 3/502723 366/127 |
| 6,361,747 B1 * | 3/2002 | Dion | B01J 19/10 366/127 |
| 6,607,008 B1 | 8/2003 | Yoshimoto et al. | |
| 7,188,933 B2 * | 3/2007 | Silverbrook | B41J 2/1642 347/65 |
| 7,188,993 B1 * | 3/2007 | Howe | B06B 1/161 366/128 |
| 8,349,273 B2 * | 1/2013 | Tabata | B01J 19/0093 422/500 |
| 2003/0044332 A1 | 3/2003 | Conrad et al. | |
| 2003/0201562 A1 | 10/2003 | Lease | |
| 2006/0266967 A1 | 11/2006 | Niura | |
| 2007/0267351 A1 | 11/2007 | Roach et al. | |
| 2009/0038932 A1 | 2/2009 | Denslow et al. | |
| 2010/0096936 A1 | 4/2010 | Bae et al. | |
| 2012/0121469 A1 | 5/2012 | Hiller et al. | |
| 2013/0329514 A1 | 12/2013 | Farrar et al. | |

FOREIGN PATENT DOCUMENTS

| | | |
|---|---|---|
| DE | 1063123 B | 8/1959 |
| EP | 1402939 A2 | 3/2004 |
| EP | 1972296 A1 | 9/2008 |
| EP | 2103344 A1 | 9/2009 |
| EP | 2793221 A1 | 10/2014 |
| GB | 2056297 A | 3/1981 |
| JP | S45-2510 A | 1/1970 |
| JP | S58223429 A | 12/1983 |
| JP | 63-028434 A | 2/1988 |
| JP | H07-004834 A | 1/1995 |
| JP | H07-019728 A | 1/1995 |
| JP | 10-128094 A | 5/1998 |
| JP | H11248349 A | 9/1999 |
| JP | 2000501651 A | 2/2000 |
| JP | 2001-293347 A | 10/2001 |
| JP | 2004-123717 A | 4/2004 |
| JP | 2004-230272 A | 8/2004 |
| JP | 2004-337649 A | 12/2004 |
| JP | 2005-060281 A | 3/2005 |
| JP | 2008-183168 A | 8/2008 |
| JP | 2009277679 A | 11/2009 |
| JP | 2010005582 A * | 1/2010 |
| JP | 2010-515565 A | 5/2010 |
| JP | 2010-539289 A | 12/2010 |
| JP | 2015-217341 A | 12/2015 |
| WO | 2008029311 A1 | 3/2008 |
| WO | 2008103622 A1 | 8/2008 |
| WO | 2011/058881 A1 | 5/2011 |
| WO | 2013089239 A1 | 6/2013 |
| WO | 2015061448 A2 | 4/2015 |

OTHER PUBLICATIONS

International Search Report and Written Opinion mailed Oct. 24, 2013 in International (PCT) Application No. PCT/US2013/043755.
Invitation to Pay Additional Fees and, Where Applicable, Protest Fee mailed Nov. 13, 2013 in International (PCT) Application No. PCT/US2013/054739.
International Search Report and Written Opinion mailed Feb. 18, 2014 in International (PCT) Application No. PCT/US2013/054739.
Office Action issued May 18, 2015 in U.S. Appl. No. 13/965,964 (14 pages).
Office Action issued Dec. 14, 2015 in U.S. Appl. No. 13/965,964 (11 pages).
Office Action issued Apr. 7, 2016 in U.S. Appl. No. 13/965,964 (9 pages).
Office Action issued Oct. 6, 2016 in U.S. Appl. No. 13/965,964 (8 pages).
Office Action issued Mar. 8, 2017 in U.S. Appl. No. 13/965,964 (7 pages).
Notice of Allowance issued Jun. 29, 2017 in U.S. Appl. No. 13/965,964 (7 pages).
Restriction Requirement mailed May 25, 2017 in U.S. Appl. No. 14/402,505 (8 pages).
Office Action issued Sep. 7, 2017 in U.S. Appl. No. 14/402,505 (6 pages).
Office Action issued Feb. 20, 2018 in U.S. Appl. No. 14/402,505 (7 pages).
Office Action issued Dec. 12, 2017 in European Patent Application No. 13730092.7.

(56) References Cited

OTHER PUBLICATIONS

Office Action issued Feb. 1, 2016 in Japanese Patent Application No. 2015-515268.
Final Office Action dated Dec. 19, 2016 in Japanese Patent Application No. 2015-515268 dated Dec. 19, 2016.
Office Action issued in Japanese Patent Application No. 2015-528520 dated Nov. 14, 2016, and English translation thereof, 6 pages.
Office Action issued in Japanese Patent Application No. 2015-528520 dated Mar. 7, 2016, and English translation thereof, 17 pages.
Notice of Allowance in Japanese Patent Application No. 2015-528520 dated Feb. 6, 2017.
Office Action issued in European Patent Application No. 13753377.4 dated Mar. 7, 2016.
Office Action in European Patent Application No. 13753377.4 dated Feb. 6, 2017.
Thayer, Ann M. "Harnessing Microreactions" Chemical & Engineering News, vol. 83, No. 22, pp. 43-52, May 30, 2005. Retrieved from: https://cen.acs.org/articles/83/i22/HARNESSING-MICROREACTIONS.html.
Corning, Inc. "The future flows through Corning® Advanced-Flow™ Reactors" Brochure 2016. Retrieved from: https://www.corning.com/media/worldwide/Innovation/documents/General%20Brochure_WEB.pdf.
Notice of Allowance issued May 14, 2019 in U.S. Appl. No. 16/157,919.
Office Action issued Jun. 12, 2019 in U.S. Appl. No. 15/695,784.
Office Action issued Jan. 30, 2020 in U.S. Appl. No. 15/695,784.
Notice of Allowance issued Jun. 12, 2020 in U.S. Appl. No. 15/695,784.
Notice of Allowance issued Jul. 18, 2018 U.S. Appl. No. 14/402,505 (7 pages).
Office Action issued Oct. 5, 2018 in European Patent Application No. 13730092.7.
International Search Report and Written Opinion mailed Oct. 24, 2018 in International (PCT) Application No. PCT/US2018/047890.
International Search Report and Written Opinion mailed Nov. 22, 2018 in International (PCT) Application No. PCT/US2018/047788.
Office Action issued Nov. 27, 2018 in U.S. Appl. No. 16/157,919.
Extended European Search Report issued Jun. 17, 2019 in European Patent Application No. 19154132.5.
Office Action issued Feb. 17, 2022 in European Patent Application No. 18765311.8 (5 pages).

\* cited by examiner

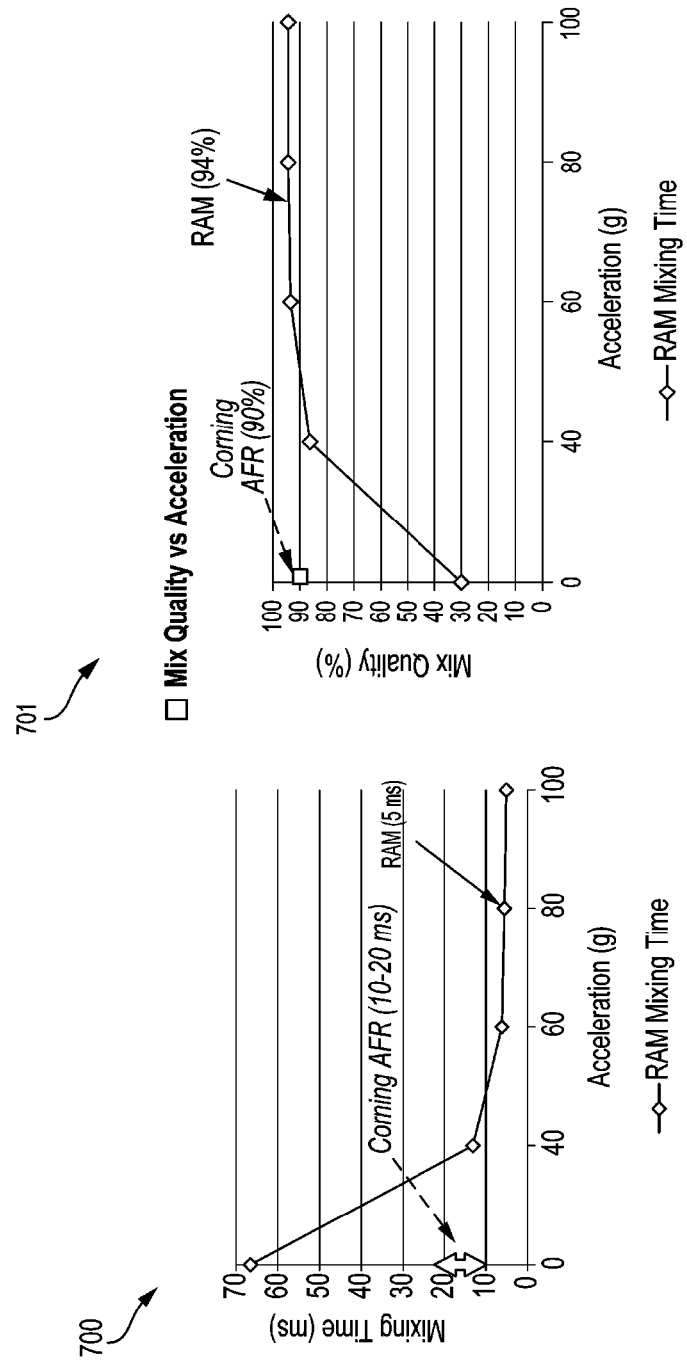

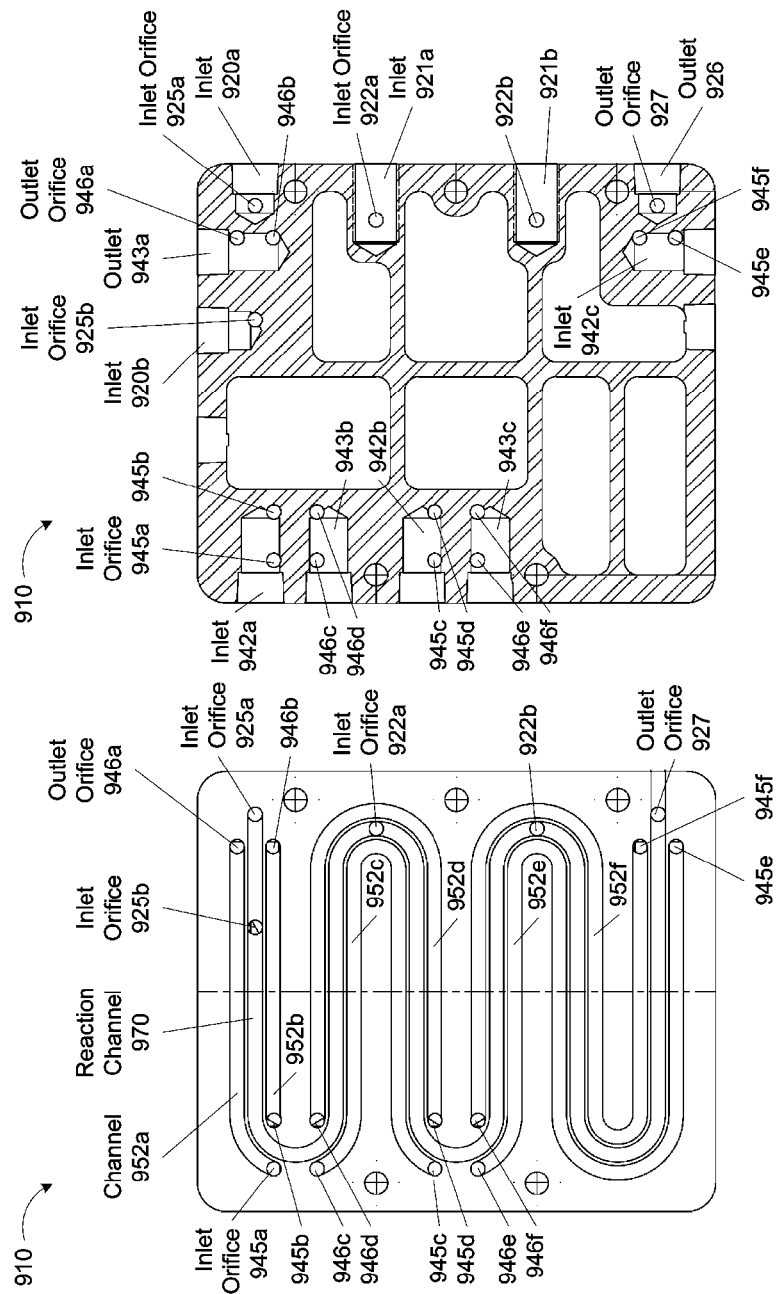

CONTINUOUS ACOUSTIC CHEMICAL MICROREACTOR

RELATED APPLICATIONS

This patent application is a continuation of U.S. patent application Ser. No. 17/195,394, filed on Mar. 8, 2021, entitled "Continuous Acoustic Microreactor," which is a divisional of U.S. patent application Ser. No. 15/686,784, filed on Aug. 25, 2017, entitled "Continuous Acoustic Chemical Microreactor," which is a continuation-in-part of U.S. patent application Ser. No. 13/965,964, filed on Aug. 13, 2013, entitled "Mechanical System That Continuously Processes A Combination Of Materials," which claims the benefit of U.S. Provisional Patent Application No. 61/742,923, filed on Aug. 20, 2012, entitled "Continuous Acoustic Processing," and is a continuation-in-part of International Application No. PCT/US2013/043755, filed on May 31, 2013, entitled "Mechanical System That Fluidizes, Mixes, Coats, Dries, Combines, Chemically Reacts, and Segregates Materials," which itself claims the benefit of U.S. Provisional Patent Application No. 61/689,256, filed on May 31, 2012, entitled "Mechanical System That Fluidizes, Mixes, Coats, Dries, Combines, Chemically Reacts, or Segregates Materials." The disclosure of each of the aforementioned applications is incorporated herein by reference.

BACKGROUND

A continuous acoustic mixer (CAM) is a device that can impart acoustic energy onto one or more materials passing through it. The acoustic energy can mix, react, coat, or combine the materials. The CAM can often process materials more quickly and uniformly than batch mixers.

SUMMARY

At least one aspect is directed to a continuous acoustic chemical microreactor system. The system includes a continuous process vessel configured to oscillate along an oscillation axis. The continuous process vessel includes a reactant inlet configured to receive one or more reactants into the continuous process vessel. The continuous process vessel includes an elongated tube coupled at a first end to the reactant inlet and configured to receive the reactants from the reactant inlet. The elongated tube has an inner surface having a hydraulic diameter of less than 2.5 cm. The continuous process vessel includes a product outlet coupled to a second end of the elongated tube and configured to discharge a product of a chemical reaction among the reactants from the continuous process vessel. The system includes an acoustic agitator coupled to the continuous process vessel and configured to agitate the continuous process vessel along the oscillation axis such that the inner surface of the elongated tube accelerates the one or more reactants in alternating upward and downward directions along the oscillation axis.

In some implementations, the acoustic agitator can be configured to agitate the continuous process vessel with an acceleration greater than 60 g.

In some implementations, the elongated tube can be at least 10 cm long.

In some implementations, the elongated tube can have an inner surface having a hydraulic diameter of less than 0.5 cm.

In some implementations, the continuous process vessel can include a coolant inlet configured to receive a cooling fluid, an interstitial region within the continuous process vessel and surrounding the elongated tube, and a coolant outlet for discharging the cooling fluid from the interstitial region. The interstitial region can be configured to receive the cooling fluid and bring it into contact with an outer surface of the elongated tube.

In some implementations, the continuous process vessel can include a heater inlet configured to receive a heating fluid, an interstitial region within the continuous process vessel and surrounding the elongated tube, and a heater outlet for discharging the heating fluid from the interstitial region. The interstitial region can be configured to receive the heating fluid and bring it into contact with an outer surface of the elongated tube.

In some implementations, the inlet can be configured to receive a transport gas.

In some implementations, the system can be configured to operate at mechanical resonance.

In some implementations, the system can include a second reactant inlet coupled to the elongated tube at a point between the first end and the second end and configured to receive a midstream reactant and introduce it into the elongated tube.

In some implementations, the inner surface of the elongated tube can have a cross section that is substantially circular.

In some implementations, the inner surface of the elongated tube can have a cross section that is substantially ovular.

In some implementations, the inner surface of the elongated tube can have a cross section that is substantially rectangular.

In some implementations, the inner surface of the elongated tube can have a cross section that is substantially square.

In some implementations, the inner surface of the elongated tube can have a cross section that is substantially triangular.

In some implementations, the inner surface of the elongated tube can be smooth.

In some implementations, the inner surface of the elongated tube can be rough.

In some implementations, the inner surface of the elongated tube can be coated with a catalyst.

In some implementations, the acoustic agitator can be configured to agitate the continuous process vessel at a frequency greater than 10 Hz and less than 100 Hz.

At least one aspect is directed to a method of continuously processing a combination of materials in a chemical microreactor. The method includes introducing, via a reactant inlet, one or more reactants into an elongated tube coupled at a first end to the reactant inlet and configured to receive the reactants from the reactant inlet. The elongated tube has an inner surface having a hydraulic diameter of less than 2.5 cm. The method includes agitating, using an acoustic agitator coupled to the continuous process vessel, the continuous process vessel along the oscillation axis such that the inner surface of the elongated tube accelerates the one or more reactants in alternating upward and downward directions along the oscillation axis. The method includes discharging, from a product outlet coupled to a second end of the elongated tube, a product of a chemical reaction among the reactants from the continuous process vessel.

In some implementations, the method can include introducing, via a coolant inlet, a cooling fluid into an interstitial region within the continuous process vessel and surrounding the elongated tube, and discharging, via a coolant outlet, the cooling fluid from the interstitial region. The interstitial region can be configured to receive the cooling fluid and bring it into contact with an outer surface of the elongated tube.

In some implementations, the method can include introducing, via a heater inlet, a heating fluid into an interstitial region within the continuous process vessel and surrounding the elongated tube, and discharging, via a heater outlet, the heating fluid from the interstitial region. The interstitial region can be configured to receive the heating fluid and bring it into contact with an outer surface of the elongated tube.

In some implementations, the method can include introducing a midstream reactant into the elongated tube via a second reactant inlet coupled to the elongated tube at a point between the first end and the second end.

In some implementations, the method can include introducing a transport gas into the reactant inlet. In some implementations, the transport gas is introduced to maintain a gas fraction in the elongated tube greater than 5% and less than 90%.

In some implementations, the method can include agitating the continuous process vessel with an acceleration greater than 60 g.

In some implementations, the method can include agitating the continuous process vessel at a frequency greater than 10 Hz and less than 100 Hz.

In some implementations, the method can include agitating the continuous process vessel at a mechanical resonance of the combined acoustic agitator and continuous process vessel system.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 7A shows example results of experiments conducted with a continuous acoustic chemical microreactor measuring mixing time versus acceleration;

FIG. 7B shows example results of experiments conducted with a continuous acoustic chemical microreactor measuring mix quality versus acceleration;

FIGS. 9A and 9B illustrate horizontal cross sections of an example horizontal plate process vessel suitable for use as a continuous acoustic chemical microreactor, according to an illustrative implementation;

DETAILED DESCRIPTION

Figure 1:
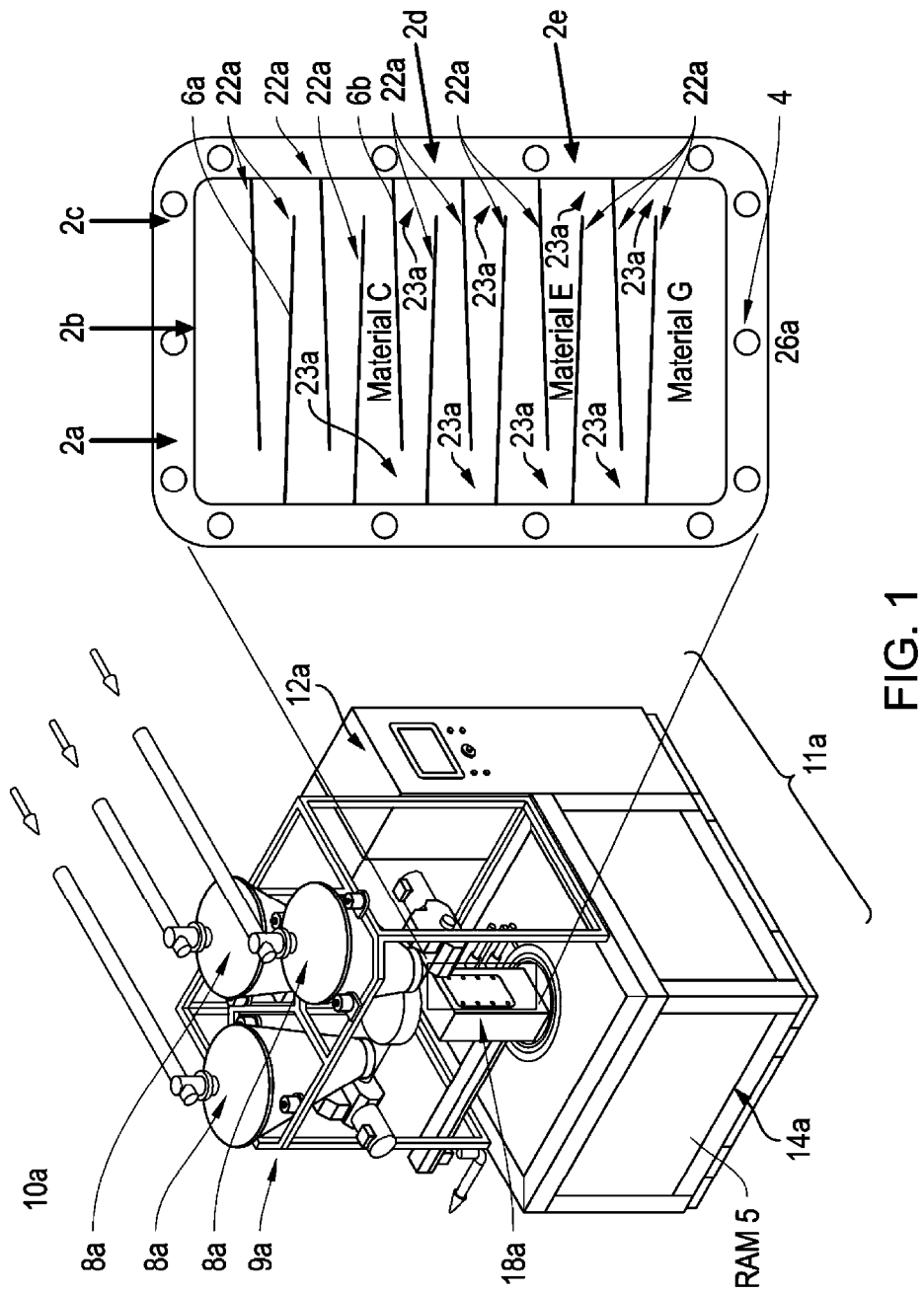
FIG. 1 is a diagram of a continuous acoustic mixer for continuously processing a combination of materials, according to an illustrative implementation.

A continuous processing system is described herein that has distinctive features that separate it from other mixers currently available, such as laminar regime mixers. The continuous processing system operates at mechanical resonance that enables large vibrational amplitudes at low-frequencies, for example, in the range of between about 30 Hz to about 1 kHz. In some implementations, the system operates at about 60 Hz. These large amplitudes create a strong sinusoidal acoustic field inside of a mixing reactor or a continuous process vessel, which provides efficient and intense mixing and reacting. Additionally, the displacement of plates or other structures disposed within the continuous process vessel can impose large acceleration forces on the materials to increase the efficiency and intensity of the mixing and reacting. Low-frequency, high-intensity acoustic energy is used to create a near uniform shear field throughout substantially the entire continuous process vessel, which results in rapid fluidization, reaction and/or dispersion of materials. Operation at such high accelerations puts large mechanical stresses into the components of the process vessel, but, as the process vessel is oscillated at or near the resonance of the resonant system, the operation of the device can be quite efficient. Because of these features, the reliability of the equipment at extreme operating conditions is substantially improved and enables the technology to be scaled. Such systems are applicable to a wide variety of reactions and mixing applications.

Low frequency acoustic agitation (LFAA) differs from ultrasonic mixing in that the frequency of acoustic energy is orders of magnitude lower. Most ultrasonic (>20 kHz) energies are fully absorbed by the material immediately in front of the ultrasonic transducer. LFAA mixing utilizes acoustic energy, in some implementations nominally at 60 Hz (though at other frequency less than 1 kHz in other implementations), that fully penetrates substantially the entire contents of a process vessel. The acoustic energy produced by the LFAA can range from a g-force of a few g's to hundreds of g's. Unlike impeller agitation, which mixes by inducing bulk flow with eddies generated at the impeller edges, the LFAA mixing occurs on a microscale substantially uniformly throughout the mixing volume. Additional interactions with the vessel walls cause beneficial bulk flow. Sound waves radiating from the reactor plates are attenuated, scattered, reflected, or propagated as they transmit through a non-homogeneous media. Attenuation creates an energy gradient which corresponds to a body force onto the media being mixed. This force induces macro flow in the media referred to as acoustic streaming. The acoustic streaming, along with the interaction between the media and the mixing vessel, results in the micro-mixing of the media. Because the acoustic field forms throughout the process vessel there are low and in many cases no mixing dead zones and the shear may be near evenly distributed throughout the process vessel once the materials are fluidized. The scattering and reflected waves also create body forces on sub-elements of the media with volumes of different density. Depending on the density ratio and material viscosity, these body forces can be significant or negligible in performing micro mixing. In some implementation, both the top and the bottom surfaces of each structure within a process vessel, impart acoustic energy on the mixture as it travels through each level of the vessel.

The process of continuous acoustic mixing can be extended to microreactors. A primary feature of microreactors is their small size, which can allow for sufficient rates of heat transfer when conducting highly exothermic reactions. In the case of a continuous acoustic microreactor, the reaction vessel can include an elongated tube, conduit, channel, or duct for conveying the reactants and for imparting acoustic energy upon them to promote the desired reaction. The elongated tube can have various cross sections including, for example and without limitation, circular, semi-circular, elliptical, rectangular, or polygonal. The elongated tube can include an inlet for receiving one or more reactants, and an outlet for discharging a product. The elongated tube can be coiled, wrapped, or folded, etc. within the continuous process vessel to increase its length beyond the dimensions of the continuous process vessel. An acoustic agitator can agitate the continuous process vessel at frequencies and accelerations sufficient to overcome adhesion and surface tension effects of reactants with an inner surface of the elongated tube. In some implementations, a transport gas can be introduced into the tube to enhance agitation. The transport gas can be reactive or inert. In some implementations, the continuous process vessel can include an interstitial region within the continuous process vessel and surrounding the elongated tube. The interstitial region can receive a cooling fluid or heating fluid and bring it into contact with an outer surface of the elongated tube so as to continuously transfer heat out of or into the elongated tube. In some implementations, the elongated tube can include a second inlet along its length for introducing a midstream reactant. The midstream reactant can react with a product of an initial reaction that occurred upstream in the elongated tube. The midstream reactant can also or alternatively feed a reaction that requires a shorter reaction/residence time than the reaction among the reactants introduced at the first inlet. Additional midstream inlets can be provided to allow for further midstream reactants to be added at different points along the elongated tube.

The continuous acoustic chemical microreactors of the present disclosure are applicable for a broad range of chemical reactions to include, for example and without limitation, synthesis reactions, decomposition reactions, single displacement reactions, double displacement reactions, precipitation, acid-base neutralization, organic reactions, reduction-oxidation reactions, as well as reactions that produce precipitating solids and/or utilize solids as reagents.

FIG. 1 shows an example of a continuous processing system 10a. The continuous processing system 10a can include an acoustic agitator 11a and a continuous process vessel 18a. The process vessel 18a can include inlets 2a through 2e (collectively "inlets 2") configured for introducing at least one process ingredient, a plurality of plates 22a configured for directing a flow of the process ingredients through the process vessel 18a, and which are capable of transferring acoustic energy generated by the acoustic agitator 11a into the process ingredients, an outlet 26a for discharging a product of the process ingredients subsequent to the process ingredients passing through a portion of the process vessel 18a while being exposed to the acoustic energy, and a fastener 30a for removably coupling the process vessel 18a to the acoustic agitator 11a. The shape of the process vessel 18a can be configured in a variety of different implementations and can include many different components, as will be discussed in greater detail below. The different implementations of the process vessel 18a can support a variety of processes, for example mixing, combining, drying, coating, segregating, and reacting of process ingredients.

FIG. 1 shows an illustrative implementation of a continuous processing system 10a. In FIG. 1, the processing system 10a includes a process vessel 18a coupled to an acoustic agitator 11a. The acoustic agitator 11a can include an electrical cabinet 12a and a resonance assembly 14a. The acoustic agitator 11a can be a RAM® Mixer (RAM), such as those available from Resodyn Acoustic Mixers (Butte, Montana). The processing system 10a further includes multiple conduits 2a to deliver the materials to the processing system and multiple hoppers 8a to hold the materials prior to being introduced into the process vessel 18a. The conduits 2a can be any type of pipe, conduit or hose used for delivering materials, such as a solid, gas or fluid. The hoppers 8a can have any type of closed geometric figure with a hollow body to hold or transfer materials into the process vessel 18a, for example a container, barrel, funnel, or vat. The conduits 2a and hoppers 8a can be coupled to the processing system 10a by a support frame 9a. The support frame 9a can be an open structure to connect and hold the components of the processing system 10a together. The support frame 9 can be coupled to the acoustic agitator 11a, the process vessel 18a, and the hoppers 8a. The support frame 9a can be made up of multiple sections.

FIG. 1 further shows a cutaway view of one implementation of the process vessel 18a. The process vessel 18a can include multiple levels, each of the levels can include at least one of a plurality of plates 22a. The plates 22a can be configured to direct materials through the process vessel 18a. The plates 22a can be made up of many different materials, for example and without limitation, stainless steel, aluminum, and carbon steel. In some implementations, the plates 22a can have a stiffness factor of about 5,000 lbf/in or greater. In other implementations, the materials can have other stiffness factor values. The process vessel 18a can include a heated plate 6a, a cooling plate 6b, a plurality of inlets 2a-2e used for conduits to introduce different process ingredients (including, without limitation, mixture constituents, coatings, reactants, and/or buffers) at different levels of the process vessel 18a, and an exit port 4 to discharge a product of the processing system 10a. The inlets 2a-2e can be positioned along the top and/or any side of the process vessel 18a to introduce materials. The exit port 4 can be positioned along a bottom portion of the process vessel 18a.

In some implementations, the process ingredients reacting and mixing in the process vessel 18a can form a fluidized bed inside the process vessel 18a. The processing system 10a is well suited to create fluidized beds, with material particle sizes that range from nano-sized particles to particles the size of tablets. Because the fluidization is formed by vibration, processing system 10a can fluidize nanoparticles and all sizes up to tablets. The fluidized bed can be created at each level of the process vessel 18a.

Figure 2:
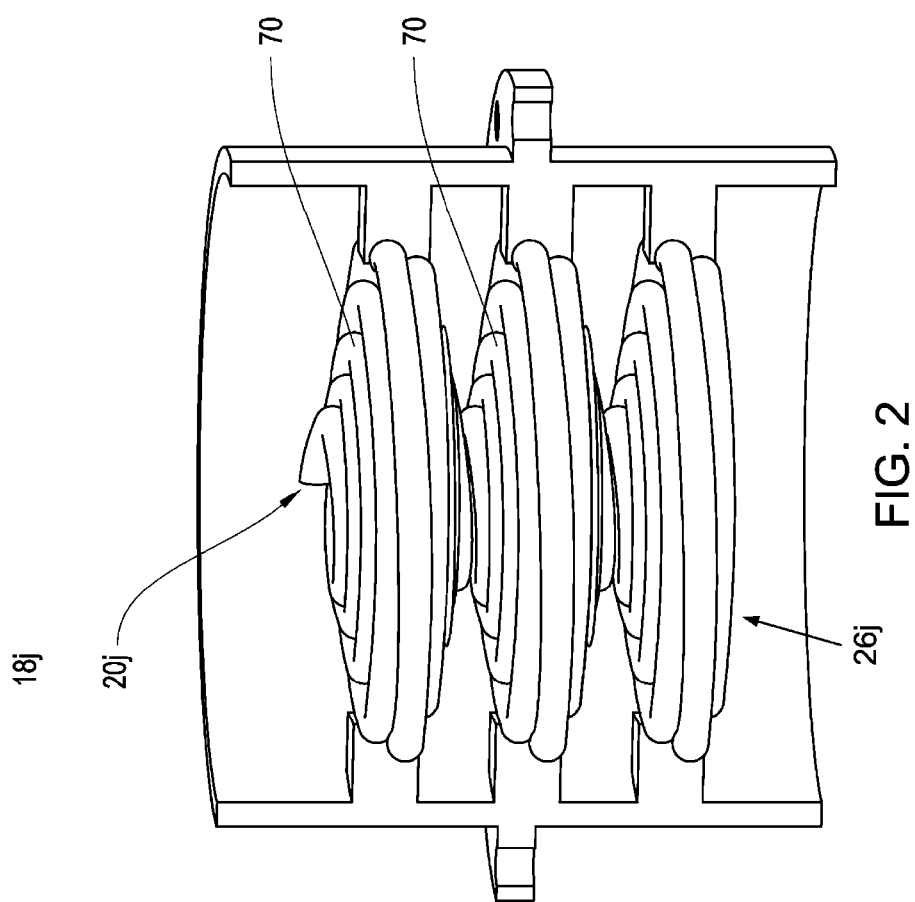
FIG. 2 shows a cutaway view of a continuous process vessel, according to an illustrative implementation.

FIG. 2 shows a cutaway perspective view of a continuous process vessel 18j, according to an illustrative implementation. Instead of the process vessel 18j being configured with plates 22a, as shown in FIG. 1, the process vessel 18j includes coiled pipes 70 for processing the materials. The process vessel 18j includes an inlet 20j, the coiled pipes 70 and an outlet 26j. Materials can be introduced to the process vessel 18j through the inlet 20j and pass through the process vessel 18j through the coiled pipes 70. The coiled pipes can be configured in a helix or spiral formation inside the process vessel 18j. In some implementations, the process vessel 18j can include compact coiled pipes to save space and maximize length of the reaction, and/or mixing process. The compact coiled pipes can allow for more coiled pipe length in the process vessel 18j to allow the materials to be in process longer. Once the materials have been substantially reacted, they can be discharged through the outlet 26j.

Figure 3:
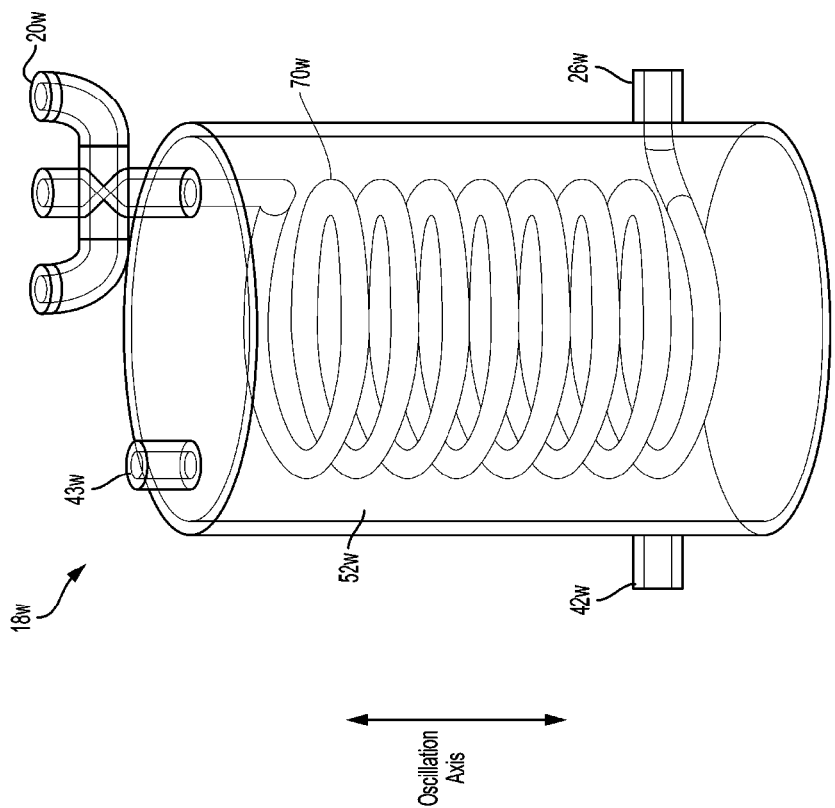
FIG. 3 shows an example process vessel suitable for use as a continuous acoustic chemical microreactor, according to an illustrative implementation.

In some implementations, the process vessel 18 can be a microreactor. A primary feature of microreactors is their small size, which can allow for sufficient rates of heat transfer when conducting highly exothermic reactions. FIG. 3 shows an example process vessel 18w suitable for use as a continuous acoustic chemical microreactor, according to an illustrative implementation. The process vessel 18w includes an elongated tube 70w coupled at a first end to a reactant inlet 20w and at a second end to a product outlet 26w. The reactant inlet 20w can receive one or more reactants and introduce them in to the elongated tube 70w. The outlet 26w can discharge a product of the reactants following a reaction among the reactants in the elongated tube 70w. In some implementations, the inlet 20w can be configured to additionally receive a transport gas for improving mixing action within the elongated tube 70w.

The elongated tube 70w can be a pipe, tube, conduit, or duct suitable for conveying liquid, solid, gas, or plasma reactants. The elongated tube 70w can be sufficiently robust to handle large alternating accelerations induced externally while reactants impact the inner surfaces. The accelerations imparted by the acoustic agitator reach a g-force of 10 g, 20 g, 40 g, 60 g, 80 g, or more. The elongated tube 70w can have dimensions and properties suitable for acting as a microreactor for highly exothermic reactions. For example, its internal volume can be kept relatively small and its thermal conductivity relatively high. In some implementations, the elongated tube 70w can have an inner surface having a hydraulic diameter of less than 2.5 cm. In some implementations, the hydraulic diameter can be between 1.5 and 2.5 cm. In some implementations, the hydraulic diameter can be between 0.5 and 1.5 cm. In some implementations, the elongated tube 70w can have an inner surface having a hydraulic diameter of less than 0.5 cm. The elongated tube 70w can be made of materials that will not react, or react only little, when in contact with certain reactants or products. For example and without limitation, the elongated tube 70w can be made of a glass, metal, ceramic, or polymer. Appropriate metals may include stainless steel, molybdenum, titanium, or monel. Other suitable elongated tubes 70w can include combinations of materials, such as a polymer- or glass-lined metals. In some implementations, it may be beneficial for the elongated tube 70w to have good thermal conductivity for conducting heat away from exothermic reactions, or heat into endothermic reactions. For example and without limitation, in some implementations the elongated tube 70w can have a thermal conductivity greater than 10 watts per meter-kelvin, roughly that of some stainless steel alloys. In some implementations, the inner surface of the elongated tube 70w can be coated with a catalyst. Such catalysts can include, for example and without limitation, metals, metal oxides, non-metals, ceramics, polymers, and nanoparticles or nano structures.

To ensure adequate residence time for reactions, the elongated tube 70w can be relatively long relative to its width. In some implementations, the elongated tube 70w is at least 5 cm long. In some implementations, the elongated tube 70w can be up to 4 m long. In some implementations, the elongated tube 70w can be between 10 cm and 1 m long. The elongated tube 70w can have various shapes. The elongated tube 70w can take the shape of a helix, spiral, series of spirals, or any other folded or wrapped shape suitable for fitting its entire length within the process vessel 18s. The elongated tube 70w can have various cross-sectional shapes. In some implementations, the elongated tube 70w can have inner and outer surfaces having a circular, elliptical, or polygonal cross section. In some implementations, the inner surface of the elongated tube 70w can be smooth around its perimeter and/or along its length in the sense that the inner surface is free of undulations or structures that would disrupt laminar flow through when the elongated tube 70w is stationary. In some implementations, the outer surface of the elongated tube 70w can include fins or other protrusions to increase its surface area and promote heat conduction.

The process vessel 18w can be coupled to the acoustic agitator 11, which can agitate the process vessel 18w along an oscillation axis. The oscillation axis may be aligned vertically; i.e., parallel with the direction of gravitational pull. When the process vessel 18w is agitated, an inner surface of the elongated tube 70w can impart acoustic energy on the reactants by accelerating the reactants in alternating upward and downward directions along the oscillation axis. The elongated tube 70w can be aligned normal to the oscillation axis such that the upper and lower portions of the inside surface agitate the reactants when the elongated tube 70w is oscillated along the oscillation axis. In some implementations, the elongated tube 70w can be positioned such that it is at, or close to, a right angle with respect to the oscillation axis. In some implementations, the elongated tube 70w can be positioned such that it is at an angle of 80 to 90° with respect to the oscillation axis such that it is angled downward in the direction of desired bulk flow. In some implementations, the elongated tube 70w can be positioned such that it is at an angle of 65 to 80° with respect to the oscillation axis such that it is angled downward in the direction of desired bulk flow. In some implementations, the elongated tube 70w can be positioned such that it is at an angle of 45 to 65° with respect to the oscillation axis such that it is angled downward in the direction of desired bulk flow. The acoustic agitator 11 can be powerful enough to agitate the process vessel 18w at high rates of acceleration. In some implementations, the acoustic agitator is configured to agitate the continuous process vessel with an acceleration greater than 60 g. In some implementations, the acoustic agitator and the continuous process vessel can operate at a mechanical resonance of the acoustic agitator-continuous process vessel system. Operating at a mechanical resonance allows for energy efficient operation of the acoustic agitator under highly kinetic conditions. In some implementations, the acoustic agitator can agitate the continuous process vessel at a frequency greater than 10 Hz and less than 100 Hz.

In some implementations, the process vessel $18w$ can include features for removing heat from, or adding heat to, the reaction chamber; i.e., the elongated tube $70w$. For example, the process vessel $18w$ can include a second inlet $42w$ for receiving a fluid, such as a cooling fluid or a heating fluid, a cavity or interstitial region $52w$ within the process vessel $18w$ and surrounding the elongated tube $70w$, and an outlet $43w$ for discharging the fluid from the interstitial region $52w$. Fluid within the interstitial region $52w$ can circulate around, and come into contact with, an outer surface of the elongated tube $70w$ to remove heat from an exothermic reaction occurring within the elongated tube $70w$, or provide heat to an endothermic reaction occurring within the elongated tube $70w$. Circulation of the fluid can occur through external pumping and/or through the agitation of the process vessel $18w$. In some implementations, the fluid can flow through the interstitial region $52w$ in substantially the same direction as reactants flowing through the elongated tube $70w$. In some implementations, the fluid can flow through the interstitial region $52w$ in a direction substantially counter to the direction of the flow of reactants flowing through the elongated tube $70w$.

Figure 4:
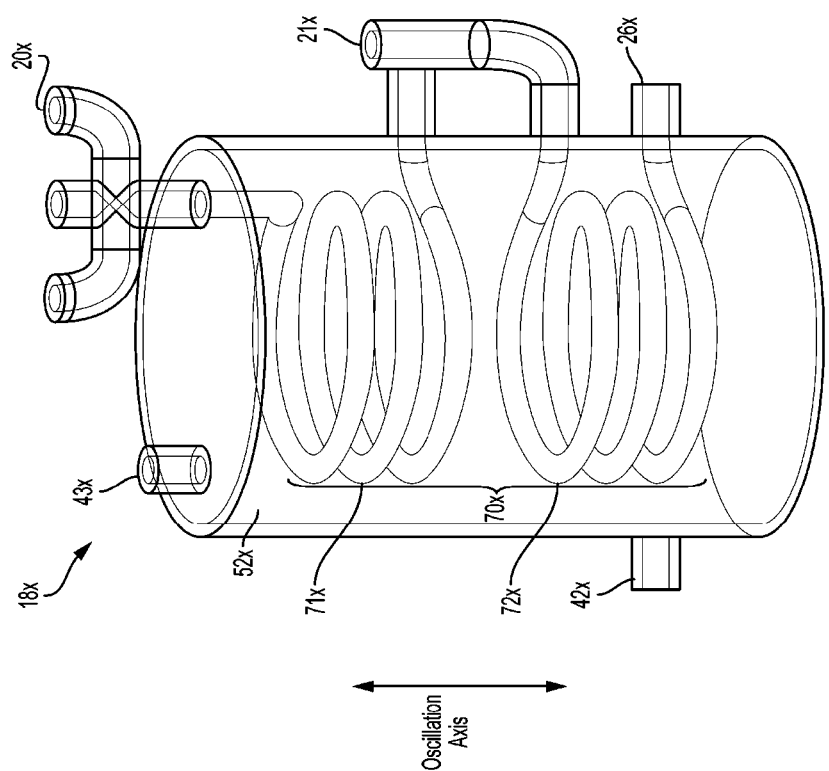
FIG. 4 shows an example process vessel having a second inlet for receiving a midstream reactant, and suitable for use as a continuous acoustic chemical microreactor, according to an illustrative implementation.

In some implementations, the process vessel 18 can include a second inlet for receiving a midstream reagent. The second inlet can introduce the midstream reagent into a midpoint (not necessarily the exact geometric midpoint) somewhere along the elongated tube. A midstream reagent can react with a product of an initial reaction occurring in the portion of the elongated tube upstream from the second inlet or the midstream reagent may be added after some reaction has already taken place because it reacts faster than the other reactants. FIG. 4 shows an example process vessel $18x$ having a second inlet for receiving a midstream reactant, and suitable for use as a continuous acoustic chemical microreactor, according to an illustrative implementation. The process vessel $18x$ includes an elongated tube $70x$ having a first portion $71x$ and a second portion $72x$ coupled in series. The properties of the elongated tube $70x$ can be similar to those of the elongated tube $70w$ described previously. The elongated tube $70x$ is coupled at a first end to a reactant inlet $20x$ and at a second end to a product outlet $26x$. The reactant inlet $20x$ can receive one or more reactants and introduce them into the first end of the elongated tube $70x$. The outlet $26x$ can discharge a product of the reactants and midstream reactants following a reaction in the elongated tube $70x$. The process vessel $18x$ includes a second inlet $21x$ coupled to the elongated tube $70x$ at a point where the first portion $71x$ and the second portion $72x$ meet. The second inlet $21x$ can receive one or more midstream reactants and introduce them into the second portion $71x$. Additional midstream inlets can be provided to allow for further midstream reactants to be added at different points along the elongated tube $70x$.

The process vessel $18x$ can be coupled to the acoustic agitator 11, which can agitate the process vessel $18x$ along an oscillation axis. When the process vessel $18x$ is agitated, an inner surface of the elongated tube $70x$ can impart acoustic energy on the reactants and midstream reactants by accelerating the reactants and midstream reactants in alternating upward and downward directions with respect to the oscillation axis.

Figure 5A:
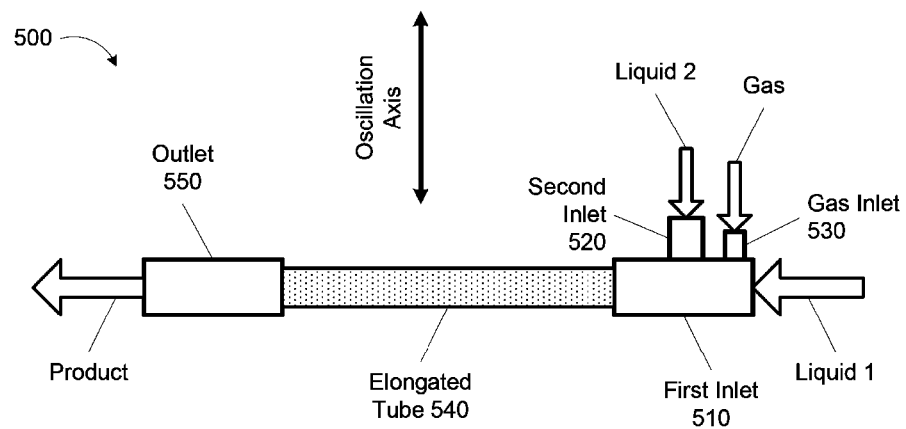
FIGS. 5A and 5B show example experimental setups of continuous acoustic chemical microreactors, according to an illustrative implementation.
Figure 5B:
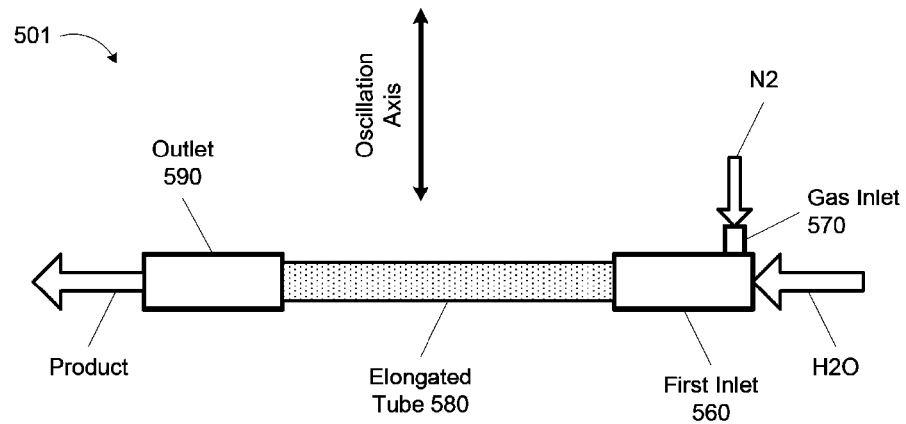

In some implementations, the process vessel $18x$ can include features for removing heat from, or adding heat to, the reaction chamber; i.e., the elongated tube $70x$. For example, the process vessel $18x$ can include a second inlet $42x$ for receiving a fluid, such as a cooling fluid or a heating fluid, a cavity or interstitial region $52x$ within the process vessel $18x$ and surrounding the elongated tube $70x$, and an outlet $43x$ for discharging the cooling fluid from the interstitial region $52x$. Fluid within the interstitial region $52x$ can circulate around and come into contact with an outer surface of the elongated tube $70x$ to remove heat from an exothermic reaction occurring within the elongated tube $70x$, or provide heat to an endothermic reaction occurring within the elongated tube $70x$. Circulation of the fluid can occur through external pumping and/or through the agitation of the process vessel $18x$. In some implementations, the fluid can flow through the interstitial region $52x$ in substantially the same direction as reactants flowing through the elongated tube $70x$. In some implementations, the fluid can flow through the interstitial region $52x$ in a direction substantially counter to the direction of the flow of reactants flowing through the elongated tube $70x$. FIGS. 5A and 5B, described below show example experimental setups of continuous acoustic chemical microreactors, according to an illustrative implementation.

FIG. 5A shows an example experimental setup of a continuous acoustic chemical microreactor 500, according to an illustrative implementation. The microreactor 500 includes a first inlet 510 for receiving a first liquid (Liquid 1), a second inlet 510 for receiving a second liquid (Liquid 2), and a gas inlet 530 for receiving a transport gas or gas reactant. In some implementations, the first inlet 510 and second inlet 520 can receive additional liquid or solid reagents or reactants. An elongated tube 540 coupled to the inlets receives the reactants and gas and serves as a reaction chamber. An outlet 550 coupled to the elongated tube 540 receives a product of the reaction from the elongated tube 540 and discharges it from the microreactor 500 so it can be analyzed. The microreactor 500 is mounted on an acoustic agitator such as the acoustic agitator $11a$ previously described.

The microreactor 500 was used for a series of tests to qualitatively gauge its performance under different amplitudes of agitation. For this series of tests, the liquid flow was ~150 ml/min and the gas volume fraction was ~30%. Acceleration of the microreactor 500 was varied from 0 to 100 g in 20 g increments. It was observed that the mixing process within the elongated tube 540 varied as a function of the acceleration applied. It was deemed appropriate to classify the mixing characteristics into two general regimes: (1) a compressive gas mix regime and (2) a highly chaotic splitting and combining regime. The regime change varies in accordance with acceleration. At accelerations below ~40 g bubbles maintain some structure and pulse as they move along the elongated tube 540, with very small pulsations at 0 g and increasing up to ~40 g.

Above ~40 g, a transition occurs, and the bubble structure breaks down. Sheets and droplets of liquid become more dispersed into the continuous phase of gas within the tube. The gas-liquid interfacial area increases and the mixing becomes chaotic in form. The chaotic features of the mix increase as the acceleration is increased above 40 g, become fully formed at ~60 g, and increase in intensity up to ~80 g, where it is hard to discern addition chaotic mixing features from ~80 g to the maximum tested operating condition of 100 g (higher levels of acceleration may be employed for other use cases without departing from scope of this disclosure).

Throughout the chaotic mixing regime the fluid appears to be propelled across the diameter of the elongated tube 540 from one portion of the inner surface to the other, corresponding to the agitating motion of the elongated tube 540 as it is vibrated by the acoustic agitator. The mixing regime showed a lack of bubbly structure and more of a froth-like mixing regime over 60 g as noted above.

A certain proportion of gas within the microreactor 540—i.e., the gas-volume fraction—can promote high levels of mixing. The gas can be of any type desired, ranging from reactive to inert. Suitable gases can include, without limitation, air, nitrogen, oxygen, argon, hydrogen, helium, carbon dioxide, neon, fluorine, chlorine, xenon, or other vapors, or combinations thereof.

FIG. 5B shows an example experimental setup of a continuous acoustic chemical microreactor 501, according to an illustrative implementation. The microreactor 501 includes a first inlet 560 for receiving a first liquid, in this case water, and a gas inlet 570 for receiving a transport gas or gas reactant, in this case nitrogen. An elongated tube 580 coupled to the inlets receives the water and nitrogen and serves as a reaction chamber. An outlet 590 coupled to the elongated tube 580 receives a product of the reaction from the elongated tube 580 and discharges it from the microreactor so it can be analyzed. The entire apparatus is mounted on an acoustic agitator such as the acoustic agitator 11a previously described.

The microreactor 501 was used for a series of tests to measure gas-liquid mass transport in a small diameter tube as a means to establish the feasibility of using acoustic agitator 11 to enhance microreactor productivity. Water was fed into the elongated tube 580 via the first inlet 560, as nitrogen was fed into the elongated tube 580 via the gas inlet 570. The acoustic agitator agitated the elongated tube 580 along the oscillation axis shown in the diagram, and the dissolved oxygen was measured in the product discharged from the outlet 590. The dissolved oxygen readings were taken every 5 seconds. The rate of nitrogen replacement of the dissolved oxygen in the water was used in Equation 1 below to determine the volumetric mass transfer coefficient ($k_L a$) at acceleration (g) levels of 0, 40 60, 80 and 100 g. (Pictures in FIG. 4, above, illustrated the relative gas-liquid mixing conditions at each of these accelerations.)

$$k_L a = \frac{1}{t} \ln \frac{c_{in} - c_{equ}}{c_{out} - c_{equ}} \qquad \text{Equation 1}$$

Figures 6A, 6B:
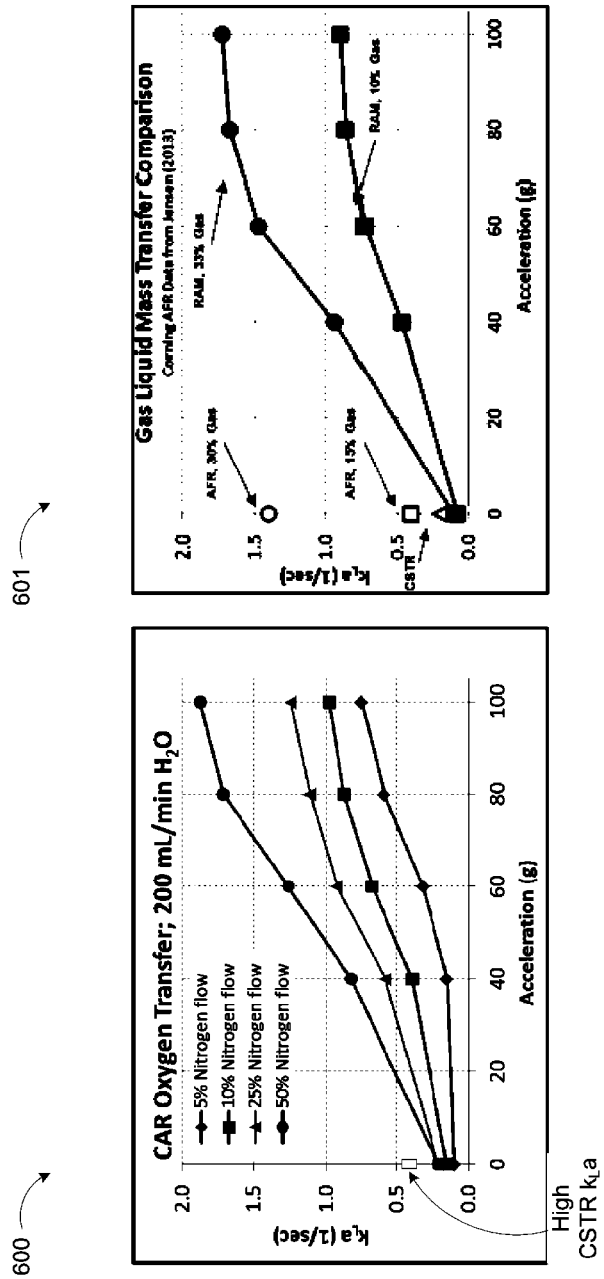
FIG. 6A shows example results of experiments conducted with the continuous acoustic chemical microreactor shown in FIG. 5B at different inlet gas flows and accelerations.
FIG. 6B shows example results of experiments conducted with the continuous acoustic chemical microreactor shown in FIG. 5B versus a Corning Advanced-Flow™ Reactor at different inlet gas flows and accelerations.

FIG. 6A shows example results 600 of experiments conducted with the continuous acoustic chemical microreactor shown in FIG. 5B at different inlet gas flows and accelerations. The data depicted in FIG. 6A shows $k_L a$ as a function of vertical tube acceleration for acceleration levels of 0, 40, 60, 80 and 100 g, at nitrogen gas fractions of 5, 10, 25, and 50%. The results 600 show measured $k_L a$ values exceeding even the highest Continuous Stirred Tank Reactor (CSTR) $k_L a$ values found in the literature.

FIG. 6B shows example results 601 of experiments conducted with the continuous acoustic chemical microreactor shown in FIG. 5B versus a Corning Advances-Flow™ Reactor at different inlet gas flows and accelerations. FIG. 6B shows a comparison of the microreactor 501 (RAM) $k_L a$ values for the 10% gas and 33% gas conditions in comparison to results published by Corning for their microreactor, called the Advanced-Flow™ Reactor (AFR) at comparable gas flow rates. In both situations the microreactor 501 $k_L a$ values exceed the reported AFR values at acceleration levels of ~60 g and greater. As shown in Table 1 below, the gas-liquid mass transport coefficient for the microreactor 501 was substantially better than that for the Corning AFR despite having a shorter residence time in the reaction zone.

TABLE 1

Gas-liquid mass transport results from the experimental microreactor 501 compared to published Corning Advanced-Flow ™ Reactor data

|  | Corning AFR | CAR (100 g) | Corning AFR | CAR (100 g) |
|---|---|---|---|---|
| % Gas | 15% | 10% | 30% | 33% |
| Residence Time (s) | 6.5 | 0.8 | 6.5 | 0.8 |
| Liquid Flow Rate (ml/min) | 80 | 100 | 80 | 100 |
| $k_L a$ (1/s) | 0.4 | 0.9 | 1.4 | 1.7 |

The microreactor 501 kLa need not depend upon turbulence developed by flow through the tubes. The microreactor 501 mixing can depend solely or primarily upon the acceleration and is therefore independent of the Reynolds number. This finding means that the microreactor 501 can have a wide flow turn-up and turn-down window and not require turbulent flow through the microreactor channels.

FIG. 7A shows example results 600 of experiments conducted with a continuous acoustic chemical microreactor measuring mixing time versus acceleration. The experiment is based on the iodide/iodate chemical test reaction, also called the Villermaux-Dushman method, which uses parallel competing reactions having different speeds. Briefly, good mixing favors the faster reaction, and the presence of an undesirable byproduct can be measured to quantify the effectiveness of mixing. The experiment was conducted to compare the effectiveness of a continuous acoustic chemical microreactor of the present disclosure with the Corning AFR™ unit previously described.

The results 600 of the Villermaux-Dushman method test are shown in FIG. 7A. The results 600 show that, at 80 g, the continuous acoustic chemical microreactor can achieve a mixing time of 5 ms, as compared to 10-20 ms as listed in the data published for the Corning AFR™ for the same reaction.

FIG. 7B shows example results 601 of experiments conducted with a continuous acoustic chemical microreactor measuring mix quality versus acceleration. The results 601 show that at 80 g, the continuous acoustic chemical microreactor can achieve a mix quality of 94%, as compared to 90% as listed in the data published for the Corning AFR™ for the same reaction. The results 600 and 601 show that the continuous acoustic chemical microreactor can outperform the Corning AFR™ in both mixing time and quality at and above 60 g of acceleration.

An example method of operation of the continuous processing system 10a will now be described with reference to FIG. 8.

Figure 8:
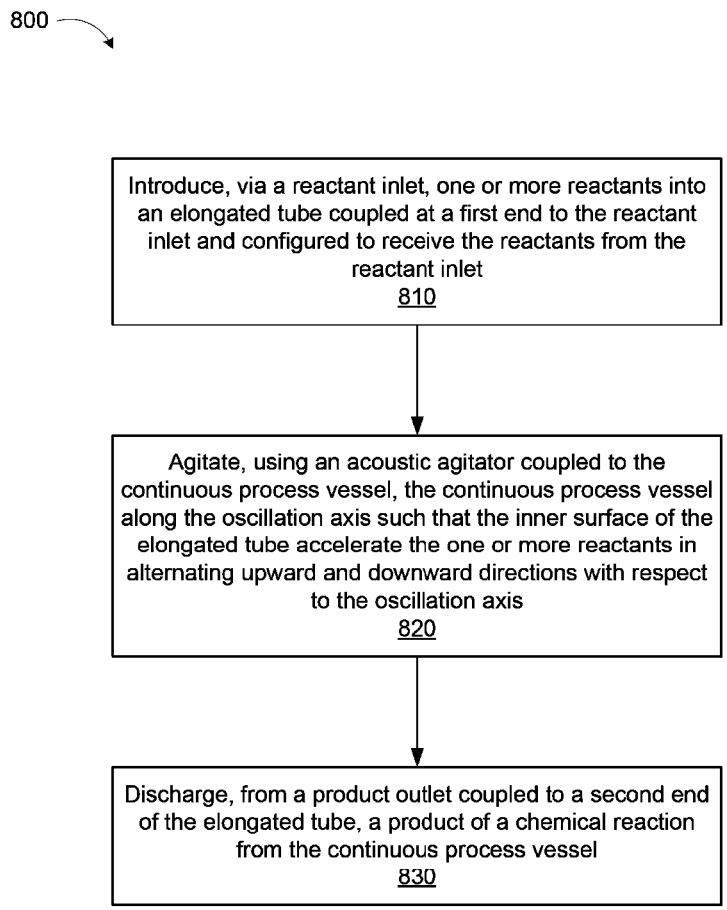
FIG. 8 is a flowchart of an example method of continuously processing a combination of materials in a chemical microreactor, according to an illustrative implementation.

FIG. 8 is a flowchart of an example method 800 method of continuously processing a combination of materials in a chemical microreactor, according to an illustrative implementation. The method 800 can be performed using a continuous acoustic mixer such as the continuous processing system 10 including, for example, one of the process vessels 18j, 18w, or 18x previously described. The method 800 includes introducing, via a reactant inlet, one or more reactants into an elongated tube coupled at a first end to the reactant inlet and configured to receive the reactants from the reactant inlet (stage 810). The method 800 includes agitating, using an acoustic agitator coupled to the continuous process vessel, the continuous process vessel along the oscillation axis such that the inner surface of the elongated tube accelerates the one or more reactants in alternating upward and downward directions with respect to the oscillation axis (stage 820). The method 800 includes discharging, from a product outlet coupled to a second end of the elongated tube, a product of a chemical reaction from the continuous process vessel (stage 830).

The method 800 includes introducing, via a reactant inlet, one or more reactants into an elongated tube coupled at a first end to the reactant inlet and configured to receive the reactants from the reactant inlet (stage 810). To ensure adequate heat removal for highly exothermic reactions, the elongated tube, such as elongated tube 70, 70w, or 70x, can be thermally conductive and have a relatively small cross-sectional area such that the surface area-to-volume ratio remains relatively high to promote rapid conduction of heat away from the elongated tube. For example, the elongated tube can have an inner surface having a hydraulic diameter of less than 2.5 cm. In some implementations, the method 800 can include introducing a transport gas into the reactant inlet simultaneously or sequentially with the reactants. The transport gas can aid mixing by allowing liquid reactants to froth and mix more vigorously and achieve a chaotic, frothy state. The transport gas can be reactive or inert. In some implementations, a certain gas-volume fraction can be maintained for increased rates of mixing. For example, transport gas can be introduced to maintain a gas-volume fraction of at least 30%.

The method 800 includes agitating, using an acoustic agitator coupled to the continuous process vessel, the continuous process vessel along the oscillation axis such that the inner surface of the elongated tube accelerates the one or more reactants in alternating upward and downward directions with respect to the oscillation axis (stage 820). In some implementations, the acoustic agitator can agitate the continuous process vessel at high rates of acceleration. For example, in some implementations, the acoustic agitator can agitate the continuous process vessel at an acceleration greater than 60 g and up to 200 g. Accelerations greater than 60 g can cause breakdown of the bubble structure of liquid reactants and transport gas and increase the gas-liquid interfacial area. Throughout the chaotic mixing regime, the reactants will be propelled across the cross section of the elongated tube from one wall to the other, corresponding to the agitating motion of the process vessel as it is vibrated by the acoustic agitator. In some implementations, the acoustic agitator and the continuous process vessel can operate at a mechanical resonance. Operating at a mechanical resonance allows for energy efficient operation of the acoustic agitator under highly kinetic conditions. In some implementations, the acoustic agitator can agitate the continuous process vessel at a frequency greater than 1 Hz and less than 1 KHz. In some implementations, the acoustic agitator can agitate the continuous process vessel at a frequency greater than 10 Hz and less than 100 Hz.

In some implementations, the method 800 can include introducing a midstream reactant into the elongated tube via a second reactant inlet coupled to the elongated tube. The midstream reactants can be, for example and without limitation, reactants requiring less residence time within the process vessel, or reactants intended to react with a product of an initial reaction occurring in the upstream portion of the elongated tube.

The method 800 includes discharging, from a product outlet coupled to a second end of the elongated tube, a product of a chemical reaction from the continuous process vessel (stage 830).

In some implementations, the method 800 can include introducing, via a coolant inlet, a cooling fluid into an interstitial region within the continuous process vessel and surrounding the elongated tube. The cooling fluid can circulate around and conduct heat away from an outer surface of the elongated tube. The method 800 can include discharging, via a coolant outlet, the cooling fluid from the interstitial region so as to remove heat from exothermic reactions occurring within the elongated tube.

In some implementations, the method 800 can include introducing, via a heater inlet, a heating fluid into an interstitial region within the continuous process vessel and surrounding the elongated tube, or duct. The heating fluid can circulate around and conduct heat into an outer surface of the elongated tube. The method 800 can include discharging, via a heater outlet, the heating fluid from the interstitial region. The heating fluid can add heat to initiate chemical reactions, or accommodate endothermic reactions occurring within the elongated tube.

Figure 9C:
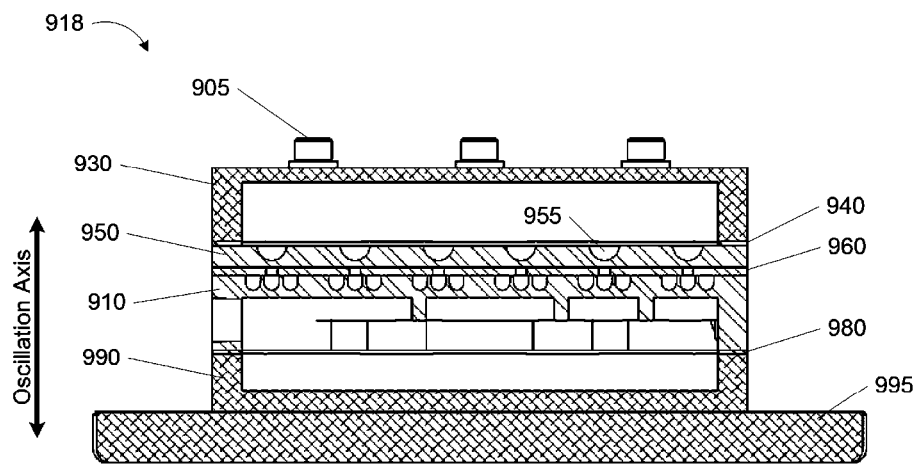
FIG. 9C illustrates a vertical cross sections of an example horizontal plate process vessel suitable for use as a continuous acoustic chemical microreactor, according to an illustrative implementation.
Figure 9D:
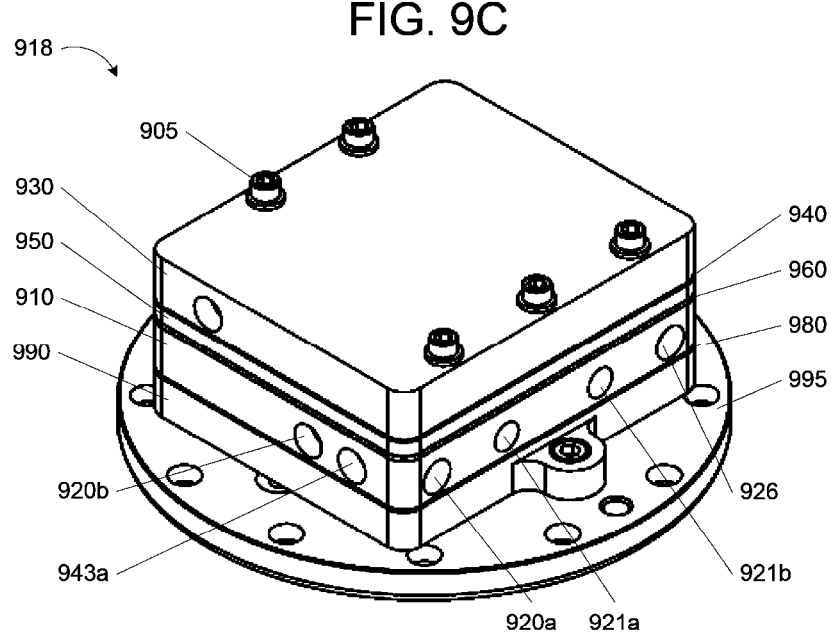
FIG. 9D illustrates a perspective view of an example horizontal plate process vessel suitable for use as a continuous acoustic chemical microreactor, according to an illustrative implementation.

FIGS. 9A through 9D illustrate different views of an example horizontal plate process vessel 918 suitable for use as a continuous acoustic chemical microreactor, according to an illustrative implementation. The process vessel 918 includes a plate 910 defining an elongated tube, referred to with respect to this implementation as a reaction channel 970. FIG. 9A illustrates a first horizontal cross section of the plate 910 showing the various channels defined therein including the reaction channel 970. FIG. 9B illustrates a second horizontal cross section of the plate 910 showing various inputs and outputs defined therein. The first and second horizontal cross sections of FIGS. 9A and 9B, respectively, are taken at different points along an axis perpendicular to the cross section; for example, the first cross section may be taken at a point above or below the second cross section along the axis. FIG. 9C illustrates a vertical cross section of the process vessel 918 showing the plate 910 and other components. As shown in FIG. 9C, the oscillation axis of the process vessel 918 lies in the vertical plane; that is, the oscillation axis is perpendicular to the horizontal planes of the cross sections illustrated in FIGS. 9A and 9B. FIG. 9D illustrates a perspective view of the process vessel 918.

FIG. 9A illustrates the first horizontal cross section of the plate 910 of the process vessel 918, according to an illustrative implementation. The plate 910 defines several channels including the reaction channel 970, which conveys reactants, reagents, transit gasses, reaction products, et cetera through the process vessel 918, and channels 952a through 952f (collectively "channels 952"), which can convey heating or cooling fluids through the plate 910 to add or remove heat from reactions occurring within the reaction channel 970. In some implementations, the plate 910 can define more or fewer channels. The plate 910 additionally defines several orifices including inlet orifices 925a and 925b (collectively "inlet orifices"), an outlet orifice 927, inlet orifices 945a through 945f (collectively "inlet orifices 945"), outlet orifices 946a through 946f (collectively "outlet orifices 946"), and inlet orifices 922a and 922b (collectively "inlet orifices 922"). Each of the various orifices connects its respective channel to one of the various inlets or outlets defined in the plate 910 and described below with reference to FIG. 9B. The various orifices can therefore pass substances between the various channels and the various inlets and outlets.

The reaction channel 970 can receive reactants, reagents, transit gas, et cetera from the inlet orifices 925. These substances can be acted upon by an inner surface of the reaction channel 970 as the process vessel 918 is agitated by an acoustic agitator, such as the acoustic agitator 11a previously described. The agitation can promote mixing or reaction of the substances within the reaction channel 970. In addition to the agitation, which occurs substantially along the axis perpendicular to the cross section, the substances exhibit a bulk flow through the reaction channel 970 from the inlet orifices 925 to the outlet orifice 927, which passes the substances to an outlet 926 shown in FIG. 9B. In some implementations, the plate 910 can define one or more inlet orifices 922 for receiving midstream reactants, similar to the process vessel 18x described above with reference to FIG. 4.

The channels 952 can receive heating or cooling fluids via the inlet orifices 945, and pass them out of the outlet orifices 946. In some implementations, the inlet orifices and outlet orifices can be reversed; that is, the heating/cooling fluids can travel through the channels 952 in the same direction as the reactants in the reaction channel 970. In some implementations, certain channels 952 can pass a heating fluid while other channels pass a cooling fluid. For example, the channels 952a and 952b may receive a heating fluid via the inlet orifices 945a and 945b, while the channels 952e and 952f receive a cooling fluid via the inlet orifices 945e and 945f, or vice-versa. The inlet orifices 945 connect to inlets 942 shown in FIG. 9B, and the outlet orifices 946 connect to outlets 943 also shown in FIG. 9B.

FIG. 9B illustrates the second horizontal cross section of the plate 910 of the process vessel 918, according to an illustrative implementation. As shown in FIG. 9B, the plate 910 defines various inlets and outlets for receiving and passing different substances including reactants, reagents, transit gasses, products, and heating/cooling fluids. The various inlets and outlets connect to the various inlet orifices and outlet orifices shown in FIG. 9A. In particular, the inlet 920a connects to the reaction channel 970 via the inlet orifice 925a, and the inlet 920b connects to the reaction channel 970 via the inlet orifice 925b. Similarly, the inlets 921a and 921b connect to the reaction channel 970 via the inlet orifices 922a and 922b, respectively. The reaction channel 970 connects to the outlet 926 via the outlet orifice 927. The inlet 942a for heating/cooling fluids connects to the channels 952a and 952b via the inlet orifices 945a and 945b, respectively, and the channels 952a and 952b connect to the outlet 943a via the outlet orifices 946a and 946b, respectively. The inlet 942b for heating/cooling fluids connects to the channels 952c and 952d via the inlet orifices 945c and 945d, respectively, and the channels 952c and 952d connect to the outlet 943b via the outlet orifices 946c and 946d, respectively. The inlet 942c for heating/cooling fluids connects to the channels 952e and 952f via the inlet orifices 945e and 945f, respectively, and the channels 952e and 952f connect to the outlet 943c via the outlet orifices 946a and 946b, respectively. In some implementations, the plate 910 can define more or fewer channels and corresponding inlets, outlets, and orifices. The inlets and outlets can be configured to receive and pass substances via hoses or pipes connected thereto. Accordingly, the inlets and outlets may include features for receiving and retaining the hoses or pipes such as threads, flanges, or edges.

FIG. 9C shows a vertical cross sections of an example horizontal plate process vessel 918 suitable for use as a continuous acoustic chemical microreactor, according to an illustrative implementation. The process vessel 918 can include an upper cap 930, a seal 940, a cap plate 950, a seal 960, the plate 910 previously described, a seal 980, a base plate 990, and a mounting flange 995. The process vessel 918 assembly can be held together by bolts 905, and mount to the acoustic agitator via the mounting plate 995. In some implementations, the process vessel 918 can be removably mounted to the acoustic agitator using bolts, clips, clamps, clasps, or other fasteners. The cap plate 950 can define additional channels 955, which can be used for conveying additional heating or cooling fluids in proximity to the reaction channel 970. The heating or cooling fluid can be held within the cavity formed by the upper cap 930. The cavity formed by the upper cap 930 can be similar to the interstitial regions 52w and 52x previously described. The cap plate 950 and plate 910 can be made of a thermally conductive material such as a metal or alloy to promote heat transfer between the reaction channel 970 and the channels 952 and 955. The process vessel 918 can be configured to oscillate along the oscillation axis shown in FIG. 9C.

FIG. 9D shows a perspective view of an example horizontal plate process vessel 918 suitable for use as a continuous acoustic chemical microreactor, according to an illustrative implementation.

Many variations of the present application will occur to those skilled in the art. Some variations may include elongated tubes of different shapes and sizes. Some variations may include additional inlets for receiving additional reactants or non-reactive materials at different points along the elongated tube. Other variations may have mixing regions having different dimensions or shapes. All such variations are intended to be within the scope and spirit of the present application.

Although some implementations are shown to include certain features or steps, the applicants specifically contemplate that any feature or step disclosed herein can be used together or in combination with any other feature or step on any implementation of the present application. It is also contemplated that any feature or step can be specifically excluded from any implementation of the present application.

While the disclosure has been disclosed in connection with the implementations shown and described in detail, various modifications and improvements thereon will become readily apparent to those skilled in the art. Accordingly, the spirit and scope of the present disclosure is to be limited only by the following claims.

What is claimed is:

1. A continuous acoustic chemical microreactor system comprising:
   a continuous process vessel configured to oscillate along an oscillation axis, the continuous process vessel including:
   a reactant inlet configured to receive one or more reactants into the continuous process vessel;
   an elongated tube coupled at a first end to the reactant inlet and configured to receive the reactants from the reactant inlet, wherein an inner surface of the elongated tube comprises a plurality of levels, wherein each of the plurality of levels comprises at least one of a plurality of plates configured to direct a flow of the one or more reactants through the elongated tube;
   a product outlet coupled to a second end of the elongated tube and configured to discharge a product of a chemical reaction among the reactants from the continuous process vessel; and an acoustic agitator coupled to the continuous process vessel and configured to agitate the continuous process vessel along the oscillation axis at a frequency greater than 10 Hz and less than 100 Hz such that the inner surface of the elongated tube accelerates the one or more reactants in alternating upward and downward directions along the oscillation axis, wherein the system is configured to operate at mechanical resonance and wherein the system is configured to form a fluidized bed of the one or more reactants at each of the plurality of levels disposed on the inner surface of the elongated tube.

2. The system of claim 1, wherein the acoustic agitator is configured to agitate the continuous process vessel with an acceleration greater than 60 times the gravitational force equivalent (g).

3. The system of claim 1, wherein the elongated tube is at least 10 cm long.

4. The system of claim 1, wherein the elongated tube has an inner surface having a hydraulic diameter of less than 0.5 cm.

5. The system of claim 1, wherein the continuous process vessel includes:
a coolant inlet configured to receive a cooling fluid;
an interstitial region within the continuous process vessel and surrounding the elongated tube, the interstitial region configured to receive the cooling fluid and bring it into contact with an outer surface of the elongated tube; and
a coolant outlet for discharging the cooling fluid from the interstitial region.

6. The system of claim 1, wherein the continuous process vessel includes:
a heater inlet configured to receive a heating fluid;
an interstitial region within the continuous process vessel and surrounding the elongated tube, the interstitial region configured to receive the heating fluid and bring it into contact with an outer surface of the elongated tube; and
a heater outlet for discharging the heating fluid from the interstitial region.

7. The system of claim 1, wherein the reactant inlet is configured to receive a transport gas.

8. The system of claim 1, comprising:
a second reactant inlet coupled to the elongated tube at a point between the first end and the second end and configured to receive a midstream reactant and introduce it into the elongated tube.

9. The system of claim 1, wherein the inner surface of the elongated tube has a cross section that is substantially circular.

10. The system of claim 1, wherein the inner surface of the elongated tube has a cross section that is substantially ovular.

11. The system of claim 1, wherein the inner surface of the elongated tube has a cross section that is substantially rectangular.

12. The system of claim 1, wherein the inner surface of the elongated tube has a cross section that is substantially square.

13. The system of claim 1, wherein the inner surface of the elongated tube has a cross section that is substantially triangular.

14. The system of claim 1, wherein the inner surface of the elongated tube is smooth.

15. The system of claim 1, wherein the inner surface of the elongated tube is rough.

16. The system of claim 1, wherein the inner surface of the elongated tube is coated with a catalyst.

17. The system of claim 1, wherein the plurality of plates are further configured to transfer acoustic energy generated by the agitator to the one or more reactants.

18. The system of claim 1, wherein each of the plurality of plates comprises a stiffness factor of at least 5000 lbf/in.

19. The system of claim 1, wherein the plurality of plates comprises at least one metal or one alloy selected from a group comprising stainless steel, aluminum, and carbon steel.

* * * * *